United States Patent
Seningen (10) Patent No.: US 9,201,993 B2
(45) Date of Patent: Dec. 1, 2015

(54) GOAL-DRIVEN SEARCH OF A STOCHASTIC PROCESS USING REDUCED SETS OF SIMULATION POINTS

(75) Inventor: Michael R. Seningen, Austin, TX (US)

(73) Assignee: Apple Inc., Cupertino, CA (US)

( * ) Notice: Subject to any disclaimer, the term of this patent is extended or adjusted under 35 U.S.C. 154(b) by 704 days.

(21) Appl. No.: 13/402,172

(22) Filed: Feb. 22, 2012

(65) Prior Publication Data

US 2012/0290274 A1 Nov. 15, 2012

Related U.S. Application Data

(60) Provisional application No. 61/485,016, filed on May 11, 2011.

(51) Int. Cl.
*G06F 7/60* (2006.01)
*G06F 17/10* (2006.01)
*G06F 17/50* (2006.01)

(52) U.S. Cl.
CPC ........ *G06F 17/5036* (2013.01); *G06F 2217/10* (2013.01)

(58) Field of Classification Search
None
See application file for complete search history.

(56) References Cited

U.S. PATENT DOCUMENTS

| 5,822,218 | A | 10/1998 | Moosa et al. | |
|---|---|---|---|---|
| 6,807,652 | B2 | 10/2004 | McConaghy | |
| 8,001,493 | B2 | 8/2011 | Joshi et al. | |
| 2008/0319717 | A1 * | 12/2008 | Joshi et al. | 703/1 |
| 2009/0112534 | A1 * | 4/2009 | Gilg et al. | 703/2 |
| 2011/0153272 | A1 | 6/2011 | Tiwary et al. | |

OTHER PUBLICATIONS

Au et al., Estimation of small failure probabilities in high dimensions by subset simulation, 2001, Elsevier, pp. 263-277.*

* cited by examiner

*Primary Examiner* — Omar Fernandez Rivas
*Assistant Examiner* — Bernard E Cothran
(74) *Attorney, Agent, or Firm* — Anthony M. Petro; Meyertons, Hood, Kivlin, Kowert & Goetzel, P.C.

(57) ABSTRACT

Various techniques for improving performance of a goal-seeking search of a computer-simulated stochastic process are disclosed. One such technique may include generating an N-point Monte Carlo simulation of a stochastic model, such as a model representative of a digital electronic circuit, and selecting a subset of M points from the N-point Monte Carlo simulation, where M is less than N. The technique may further include searching the subset of M points to identify a target value, wherein said searching comprises generating one or more M-point Monte Carlo simulations of the stochastic model; and checking the target value, wherein said checking comprises generating an additional N-point Monte Carlo simulation of the stochastic model dependent on results of searching the subset of M points.

20 Claims, 7 Drawing Sheets

GOAL-DRIVEN SEARCH OF A STOCHASTIC PROCESS USING REDUCED SETS OF SIMULATION POINTS

PRIORITY CLAIM

This application claims benefit of priority of U.S. Provisional Appl. No. 61/485,016, filed May 11, 2011, which is hereby incorporated by reference in its entirety.

BACKGROUND

1. Technical Field

This invention is related to the field of computational modeling of stochastic processes, and more particularly to techniques for efficiently performing goal-driven searches of stochastic processes.

2. Description of the Related Art

Many types of physical phenomena are not deterministic. For example, when manufacturing semiconductor circuits, it may be impossible to guarantee that devices within different regions of a substrate have identical physical or electrical characteristics. Instead, the various characteristics of different devices may exhibit random variation. In the face of such variation, it may not be possible to predict how any given device will behave with certainty.

However, it may be possible to predict how such random or stochastic processes may behave within some degree of statistical confidence. For example, random processes may conform to a particular probability distribution. If a sufficient number of data points are generated according to the relevant probability distribution, it may be possible to determine whether the process will conform to a particular expectation with a particular level of confidence (e.g., that at least 99.9% of finished parts will have fewer than some threshold number N of randomly-distributed defects).

Computer-based simulations may facilitate the statistical characterization of a stochastic process. For example, a computer may repeatedly evaluate a model of the process to generate a number of discrete observations drawn from the probability distribution that models the process. However, such modeling can demand significant amounts of computing power, time, or both in order to yield useful results. For example, in order to ensure that the probability distribution is reasonably well sampled, it may be necessary to repeat the modeling process hundreds or thousands of times.

SUMMARY

Various embodiments of techniques are disclosed that may improve the performance of goal-seeking computer-modeled stochastic simulations by reducing the amount of computational effort devoted to simulation of data points that are less likely to contribute to identification of the search goal. In an embodiment, such a method may include one or several computers performing a number of operations, including pseudorandomly generating an initial set of N observation points of a stochastic model, N being an integer value. Each of the N observation points may correspond to a respective seed, and a sequence of pseudorandom numbers used to generate a given one of the N observation points may be reproducible from the respective seed corresponding to the given observation point.

The operations may further include selecting a subset of M points from the initial set of N observation points according to a selection function, where M is an integer less than N; searching the subset of M points to identify a target value; and pseudorandomly generating a new set of observation points (which may include N points or some other number of points).

The operations may further include determining whether the new set of observation points includes one or more additional points not present in the subset of M points, according to the selection function; and in response to determining that the new set of observation points includes one or more additional points not present in the subset of M points, adding the one or more additional points to the subset of M points to generate a revised subset, and searching the revised subset to identify the target value. The operations may still further include outputting the target value determined from the subset of M points as the target value of the stochastic model in response to determining that the new set of observation points does not include one or more additional points.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

Overview of Stochastic Processes and their Modeling

Generally speaking, a stochastic process (or equivalently, a random process) is a process that behaves in at least a partially nondeterministic or random manner. That is, the behavior of a stochastic process over time is not completely predictable (although as used herein, the term "stochastic process" may encompass processes that can be characterized as a combination of deterministic and nondeterministic components). Many types of physical phenomena can be modeled as stochastic processes. For example, the physical or electrical characteristics of transistors or other circuit elements fabricated on a semiconductor substrate may be modeled according to a stochastic process. In addition, many phenomena in economics, information theory, and other fields behave stochastically. For example, stock trading patterns, information-bearing signals, queuing systems, and many other phenomena may be modeled as stochastic processes.

The random variables involved in a stochastic process may conform to one or more different types of probability distributions. For example, a random variable may be normally distributed, meaning that the frequency of occurrence of particular values of the variable conforms to a normal or Gaussian distribution characterized by a mean and a standard deviation. Although a Gaussian distribution will serve as the basis for examples provided here, it is noted that this choice is merely to facilitate description of stochastic modeling techniques, and that the choice of distribution typically depends on the type of phenomenon being modeled. The techniques described herein may also be employed with any other suitable type of probability distribution. For example and without limitation, such distributions might include any of the following: log-normal, Poisson, uniform, gamma, beta, Boltzman, exponential, Pareto, Weibull, Cauchy, chi-square, or Laplace.

Generally speaking, modeling a process (whether stochastic or deterministic) typically involves identifying, at a chosen level of granularity, the elements of the system to be modeled; defining the relationships among the elements, and simulating the behavior of the model. For example, a computer-based model of a microprocessor might be constructed at a fairly high level of abstraction by behaviorally defining various microprocessor functional units (such as caches, arithmetic-logic units (ALUs), or other types of datapath or control units). In some embodiments, a behavioral definition of a functional unit might be implemented through a module of code (e.g., expressed in a general procedural language such as C/C++, or in a hardware design language/register transfer language (RTL) such as Verilog or VHDL) that implements the functionality of the modeled unit without attempting to reflect the structure of the underlying circuitry (e.g., gates or transistors) that might be used to realize that functionality. The relationships between such modules (e.g., their interconnectivity) may be defined, for example by instantiating the modules within a higher-level module and in the process, specifying the relationships between the interfaces of the various modules. The resultant system model may then be simulated (e.g., by interpreting or by compiling and executing the resulting code in the presence of stimulus).

For example, once a behavioral model of a microprocessor is fully defined, the model may implement the entire functionality of the processor and may include an interface that represents the pin-level interface of the microprocessor to other system components (such as memory, peripherals, etc.). The processor as a whole may be simulated by executing the code included in the model, providing pin-level stimulus that mimics the data the microprocessor would receive during operation. The data produced by such execution may represent the output that would be generated by the microprocessor. (In some situations, to reduce simulation latency, processor simulations may bypass pin-level input, for example by preloading processor caches with desired instructions and/or data.)

A behavioral model of a Boolean-based circuit (such as the microprocessor discussed above) is typically deterministic, in that the functional expressions that model the intended behavior of the circuit will generally evaluate in the same manner on different occasions to produce the same result for the same inputs. (An exception might be if nondeterminism is part of the intended behavior of the circuit, for example in the case of hardware-based random number generation.)

However, the individual devices (e.g., transistors) that ultimately implement the microprocessor circuit may not behave deterministically. For example, semiconductor fabrication processes tend to produce devices that vary from their specified design parameters across the surface of a manufacturing substrate (such as a silicon wafer). At relatively large process geometries (e.g., processes having feature sizes of roughly 150 nanometers or greater), device characteristics tend to vary relatively systematically, such that different regions of the substrate may exhibit considerable variance, whereas devices in closer proximity may exhibit little variance. As a consequence, it is reasonable to assume that at large geometries, most of the devices within a single integrated circuit die that have similar design parameters will have actual performance characteristics that fall within a relatively narrow range with respect to one another. However, as a group, such devices may differ more substantially from devices in a different die on the same wafer.

Figure 1:
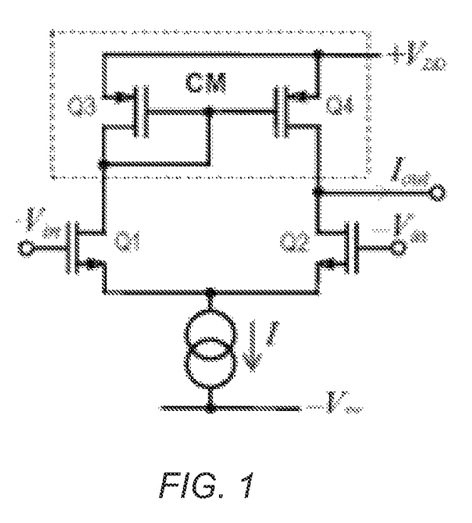
FIG. 1 illustrates an example of a differential amplifier that may be affected by localized random variations in device parameters.

As geometries decrease, however (e.g., for feature sizes below approximately 100 nanometers), the likelihood increases that different devices within the same integrated circuit—even adjacent devices—may exhibit random variation in their actual performance characteristics even though such devices might be identically specified. Such fine-grained variability can present significant challenges in the circuit design process, because the basic operation of many types of transistor-based circuits is predicated upon the premise that devices will perform as designed, and substantial variation in device performance may lead to incorrect circuit behavior. For example, a differential amplifier such as the CMOS amplifier shown in FIG. 1 may rely on different, substantially symmetrical transistors to detect the presence of a small but logically significant voltage difference across its inputs. If the transistors are not symmetric because of random process variation, the amplifier may fail to detect signals that fall within its design specifications. Other types of circuits may be similarly sensitive to random, local variations in device performance.

In the face of such random device variation, stochastic circuit modeling may be performed to determine whether a circuit design is sufficiently robust to operate correctly within a specified level of confidence (e.g., with 99% confidence that the percentage of failing circuits will be less than some threshold value N). To perform such modeling, a circuit may be specified at the level of individual devices and their connectivity. Specified characteristics of the individual devices (e.g., threshold voltage, leakage current, and/or other suitable characteristics) may then be defined as pseudorandom variables selected from an appropriate probability distribution (such as the normal distribution). The circuit may then be repeatedly evaluated using different pseudorandom values, for example using Monte Carlo simulation techniques, to ascertain how the circuit's operation varies in response to the stochastic behavior of the individual devices.

Observing the behavior of a deterministic model may require only simulating the model once for each set of input conditions, because by definition, the model should respond in the same manner if the input conditions are repeated. However, a nondeterministic model may generate different results for the same input conditions on different occasions. For this reason, when modeling nondeterministic circuit elements, it may be necessary to perform hundreds or thousands of circuit simulations to ensure that the range of possible device behavior has been sufficiently sampled.

For example, if a circuit characterized by normally-distributed parameters were simulated only once or twice, it is possible that some circuit elements might be assigned values that are "outliers" within the probability distribution (i.e., values that are one or several standard deviations away from the mean, and thus expected to be uncommon). Such an approach would potentially lead to false or skewed conclusions about the circuit's performance, because of the relative improbability of the conditions that led to the observation. Performing more simulations increases the likelihood that the observations will reflect both more and less common device states.

Thus, to be a reliable and useful tool, modeling of nondeterministic behaviors may require substantially more computational work than modeling of deterministic behaviors—potentially on the order of thousands of times as many simulations of a given circuit. This in turn adds costs to the design process, in terms of time, compute resources, or both.

Goal-Driven Search of Stochastic Processes

The process described above for modeling a stochastic process, such as the behavior of a circuit, assumes that the defining characteristics of the process are already known. That is, it assumes that the elements to be modeled and their interrelationships have already been defined. However, when designing a system that includes stochastic elements, it may not be immediately apparent whether a given set of design choices yields a particular performance goal. That is, it may be necessary to make design choices, model the system (including its stochastic elements), evaluate the results to determine whether the goal is satisfied, refine the design choices based on the observations, and model the system again—an iterative process that multiplies the level of computational work to be performed. This overarching process may be referred to as a goal-driven search, in that it seeks to determine the value of one or more parameters that achieve some goal, which may be defined in any suitable terms (e.g., failure rate, performance, size, etc.).

In a deterministic system, a goal-driven search may be undertaken by, for example, iteratively performing an optimization algorithm on an objective function or set of equations that characterize the system in order to identify the parameters (if any) that achieve the goal. However, goal-driven search in a nondeterministic system poses the same challenge noted above: it is usually necessary to evaluate a number of random points during any given search iteration in order to ascertain the difference between the current state of the system (i.e., the current values of the parameters being optimized) and the desired state. Thus, as with the simpler case of system modeling, goal-driven search of a stochastic process tends to be more computationally demanding than a similar search of a deterministic process.

Figure 2:
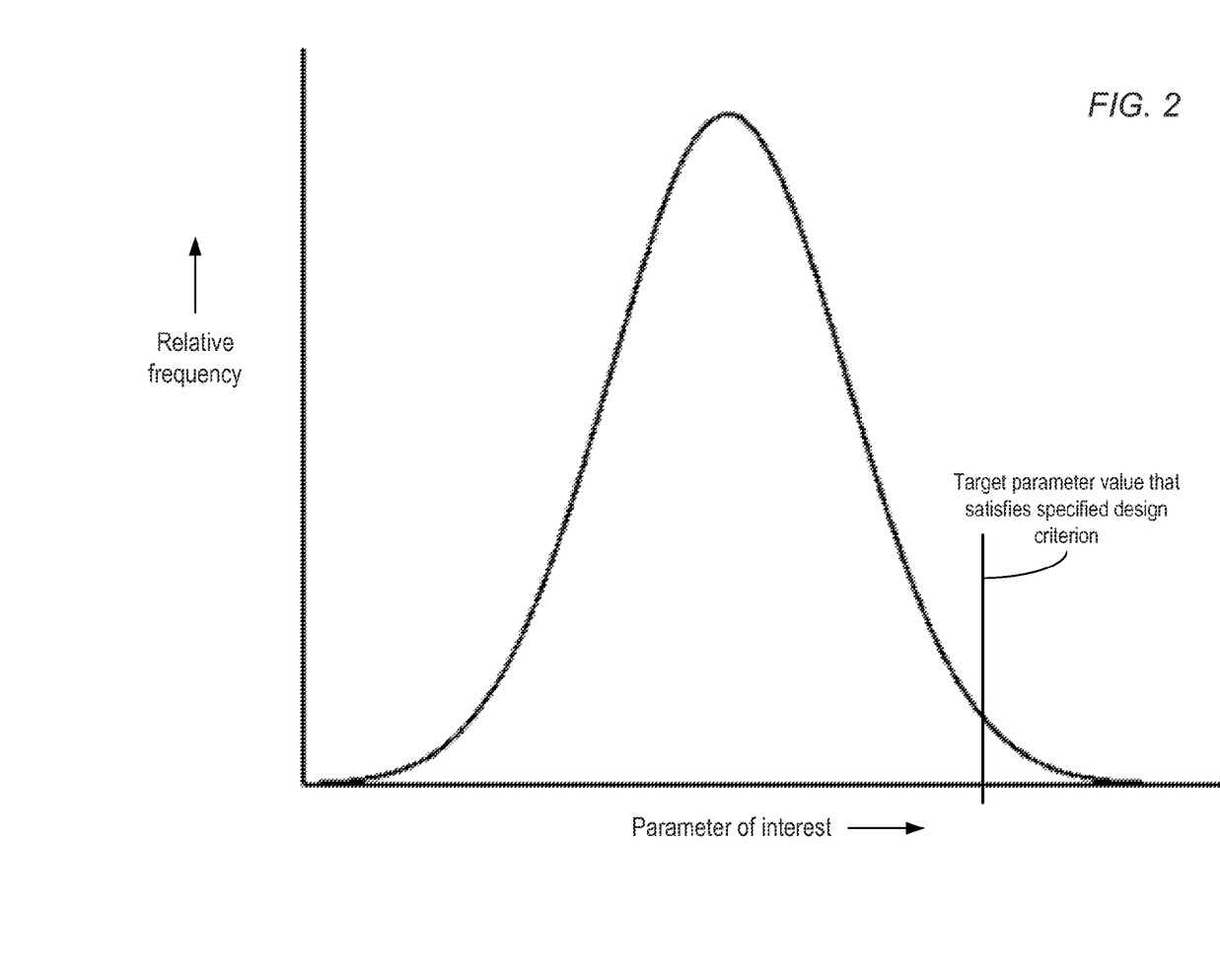
FIG. 2 graphically illustrates a result produced by a goal-driven search of a stochastic process.

FIG. 2 graphically illustrates the inquiry posed by a goal-driven search of a stochastic process. In FIG. 2, a parameter of interest is shown along the x axis, with the relative frequency of the parameter shown along the y axis. As shown, the parameter of interest is normally distributed about a mean value (though as noted above, any other type of distribution may be employed).

As a non-limiting example to facilitate discussion, the parameter of interest might correspond to the hold time parameter in a synchronous logic circuit. Generally speaking, hold time may refer to the minimum length of time a given signal needs to be held in a valid state before the given signal is allowed to change (e.g., in response to a new input value). A signal that satisfies the hold time requirement will be captured by downstream logic (e.g., a state element such as a latch or flip-flop) before changing to a different value. A signal that fails to satisfy the hold time requirement may transition before it has been captured, resulting in loss of information and possibly incorrect circuit operation.

Typically, the necessary hold time for a given signal is a function of the electrical properties of the circuit elements (e.g., transistors and wires) that generate, drive, and receive the signal. But as noted previously, these electrical properties may be stochastically distributed rather than deterministic, leading to some degree of variability in the hold time requirements for different manufactured instances of the same circuit.

One approach to addressing hold time issues would be to simply design circuits that hold their outputs for an arbitrarily long period of time, ensuring that the outputs are captured well before the output-generating circuits transition again. However, just as insufficient hold times may result in unacceptable operational failures, excessive hold times may result in unacceptably slow circuit performance. Put another way, an output-generating circuit that holds its output longer than is necessary to ensure proper operation sacrifices performance, because once the current value of the output was captured, the circuit could have begun generating the next value of the output, but instead continued to hold. Thus, determining hold time requirements may involve not just determining a hold time value that provides correct operation, but also attempting to determine the smallest such hold time value, such that excessive hold time does not compromise performance.

FIG. 2 may now be interpreted in the context of the hold time example just discussed. In such an embodiment, the parameter of interest may correspond to hold time, and the goal of the design process may be to find the value of this parameter that satisfies a design criterion. Such a criterion might be expressed as a maximum failure percentage (e.g., no more than 1% failures, 0.01% failures, etc.) or an equivalent passing percentage, or in other terms such as a maximum number of failing simulations per a total number of simulations performed. That is, the goal of the process may not be to find a "perfect" hold time, but rather to identify the value that is expected to be satisfactory on at least some defined number of instances.

Improving Performance of Goal-Driven Search

One approach to solving the problem of identifying a suitable hold time value would be to iteratively evaluate the performance of a circuit model, adjusting circuit parameters to increase or decrease the observed hold time parameter (or another metric that serves as a proxy for this parameter) until the specified design criterion (e.g., failure rate) is met. But as noted above, hold time behavior may vary stochastically. Thus, each evaluation of the stochastic circuit model may involve simulation of the model at hundreds or thousands of randomly or pseudorandomly selected data points, such as by using Monte Carlo techniques.

However, as can be seen in FIG. 2, as the target parameter value approaches one of the "tails" of the distribution, the number of occasions on which pseudorandom simulation will generate a value of the parameter of interest that lies outside the target zone will decrease substantially. For example, suppose the target parameter value happened to fall at the 99.7% percentile in the distribution, such that on 99.7% of occasions, the actual observed parameter value would satisfy the target value, failing to do so on only 0.3% of occasions. It follows from this that on average, of every 1000 pseudorandom trials, only 3 trials may produce a parameter value that falls outside of the range of the target parameter value.

The relative infrequency of points falling within the extremes of a probability distribution has implications for goal-driven search. For example, one type of procedure for identifying a target value is the bisectional search algorithm, in which two endpoints A and B that define an interval are examined. If the target value lies between the endpoints, then one endpoint will pass the threshold-determining test, and one endpoint will fail this test. The midpoint M of the interval may then be determined (e.g., by bisecting the interval) and tested. If the midpoint test passes, then the target value lies between the interval defined by M and B; otherwise it lies between A and M. The midpoint of this new interval is then determined, and the process repeats until the size of the interval reflects the desired precision of the result.

As just described, a search algorithm like the bisectional search is predicated on examining both failing and passing values in order to refine the interval in which the target value is located. (That is, such a search algorithm is analogous to repeatedly traversing a boundary in order to precisely map the boundary's location.) But as noted above, when operating at the extremes of a probability distribution, "passing" points (or more generally, points that lie within one region of the distribution) may overwhelmingly outnumber "failing" points (or more generally, points that lie within a different region of the distribution). Conducting a goal-driven search of a stochastic process may thus require the computation of many hundreds or thousands of points—most of which are not useful or needed in the search—in order to obtain the small number of points that may be needed to effectively conduct the search.

However, in some embodiments, it may be possible to perform goal-driven search of a stochastic process in a manner that eliminates some of the repeated generation of points that fail to add information to the search process and attempts instead to focus on analysis of points close to the threshold of interest. In turn, this would reduce the computational burden of performing such searches.

It is first noted that in a computational context, random number generation is typically performed by executable code that implements a number generation algorithm. Most, if not all, such algorithms use an initial value or "seed" from which a sequence of numbers is generated. Because the algorithm is itself deterministic and thus at least theoretically predictable, its output is not truly random, but is instead typically referred to as "pseudorandom." (As used herein, algorithmic random number generation and pseudorandom number generation may be understood to be synonymous.) Even though not truly random, the pseudorandom output of an algorithmic random number generator may nevertheless appear to be random, and may satisfy various statistical tests of randomness. For example, pseudorandom generators may be constructed that satisfy statistical tests that attempt to detect patterns in the output data, such as by determining whether particular values or sequences of values are overrepresented in the pseudorandom output relative to a truly random sequence.

Pseudorandom number sequences are often adequate for many applications of stochastic modeling. Pseudorandom number generators also exhibit the phenomenon of repeatability: although a given sequence of pseudorandom numbers generated from a given seed may appear to be random, the same sequence can be freely generated from the same given seed an arbitrary number of times. Thus, so long as the pseudorandom numbers are used consistently each time (e.g., so long as each number in the sequence is used by the model in the same manner and in the same order, without changing the model), the behavior of a stochastic model can be repeated at will by supplying the same seed.

Generally speaking, this property of reproducibility may enable particular seeds corresponding to data points of interest to be identified and selectively reused. For example, those seeds that yield data points that are close to or within the low-probability region of interest (e.g., the right side of the target boundary illustrated in FIG. 2) may be identified and reused during the search process. By contrast, seeds that yield results within the high-probability region (e.g., the left side of the target boundary illustrated in FIG. 2) may be deferred during some portions of the search process. By performing further simulation steps on a subset of seeds identified in this manner, rather than on the full set of seeds used to initially evaluate the model, the computational demands of the search process may be reduced.

Figure 3:
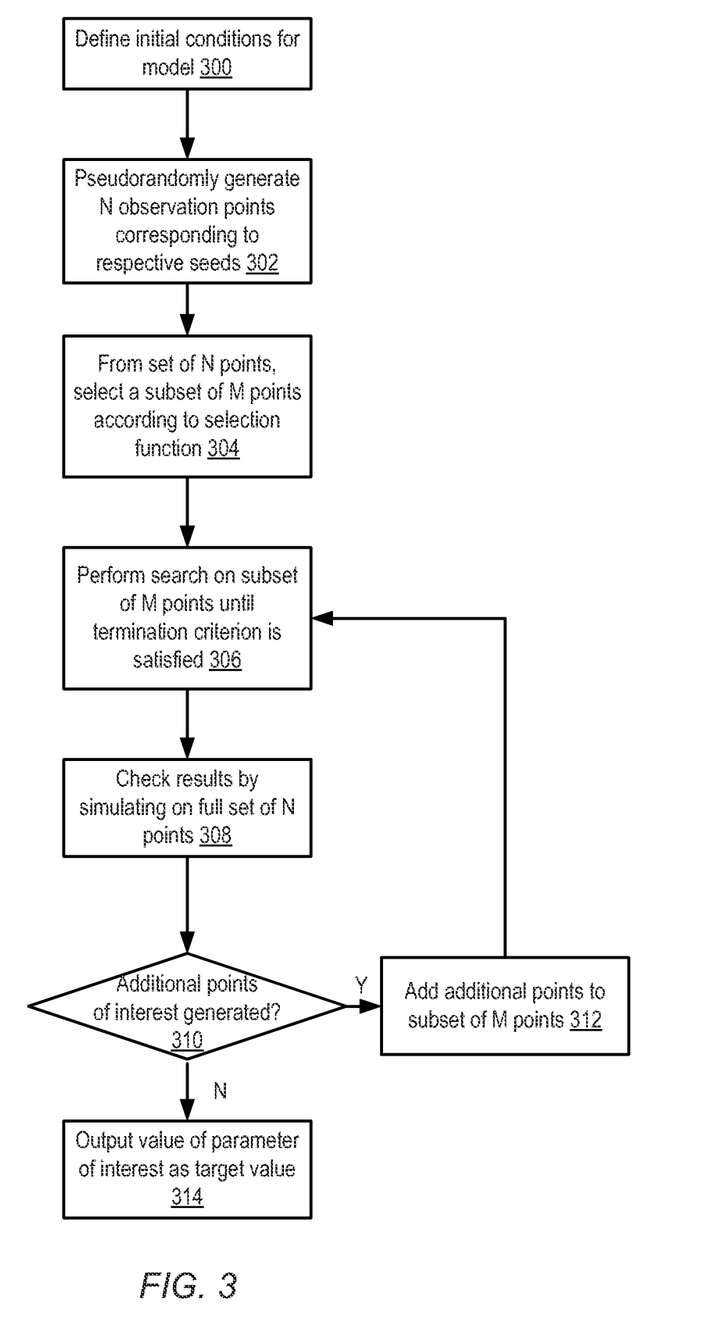
FIG. 3 illustrates an embodiment of a method of performing a goal-driven search of a stochastic process.

FIG. 3 illustrates an embodiment of a general method of performing goal-driven search of a stochastic model. As shown, operation begins with defining relevant initial conditions for the model (block 300). For example, such conditions may include defining an initial state of the system being modeled, such as a circuit's reset state. Additionally, an initial condition may be selected for the parameter being searched. For example, depending on its nature, the parameter may be set to an arbitrarily large or small value, to zero, or to another appropriate initial condition.

The model may then be simulated to pseudorandomly generate a full set of N observation points based on the initial conditions and the random variables defined for the model, where each point corresponds to a respective seed used by the pseudorandom number generator (block 302). N may be any suitable number of data points sufficient to represent the behavior of the stochastic model with the desired level of granularity. For example, Monte Carlo techniques may be used to generate a set of 1,000 observations of the model based on 1,000 respective seeds.

In some models, the parameter of interest may be directly observed through simulation. However, in other situations, the model parameter that is measured may be a proxy for or predictor of the parameter of interest, rather than the parameter itself. For example, where hold time is the parameter of interest, the measured phenomenon might be the total propagation delay from a data input to a state element output (e.g., D-Q delay), the propagation delay from a clock input to a state element output (e.g., clk-Q delay), or some other measurement.

From the initial set of N observation points, a subset of M points (where M is less than N) is selected, such that the selected points fall in or near the region of interest according to a selection function (block 304). In some embodiments, the N points could be ordered, and a fixed number or percentage of the points closest to the region of interest could be selected. For example, the 1,000 hold time observations could be sorted, and the largest 50 values (or some other number) could be selected. In other embodiments, other selection functions could be used, possibly based on model state in addition to or instead of the parameter of interest. For example, the simulation state of a particular model run could be compared against an expected state to determine whether the run represents success or failure. Those ones of the N observation points corresponding to failing runs could be selected (possibly in combination with some number of points corresponding to passing runs, e.g., in order to ensure that the subset of M points straddles the goal value that the search is attempting to identify).

A search process may then be performed using the subset of M points until a termination criterion is satisfied (block 306). For example, a bisectional search may be iteratively performed as described above in order to identify the boundary between passing and failing regions of the parameter distribution. However, during each iteration of the bisectional search, only the seeds corresponding to the selected M points may be used, rather than the seeds corresponding to the full set of N observation points that was initially generated. For example, the iterative bisectional search might be performed on 50 points rather than 1,000 points, decreasing the amount of computation required by roughly a factor of 20.

It is noted that although the specific example of a bisectional search has been used here, any other type of search algorithm may also be employed. Moreover, any suitable termination criterion may be employed. For example, the search may terminate after a defined number of iterations, after the difference between successive values of the parameter being searched falls below some threshold value (in absolute or percentage terms), or after some other condition is detected.

Once the search process on the subset of M points is complete, the results of the search may be checked by generating a new set of N points (block 308). In some instances, some or all of the seeds corresponding to the original N points may be reused, while in other instances, an entirely new set of seeds may be used. In many instances, simulation of the larger set of N points following the search does not produce additional outliers. However, if additional outliers (e.g., failures) not represented in the initial set of M points are observed, further simulation may be needed.

In the event that additional points of interest are generated during the check (block 310), they may be added to the subset of M points (block 312), and the search process may once again be performed on the augmented subset (block 306). Otherwise, the value of the parameter of interest that is produced during the search process may be output as the target value of the parameter, and operation may be complete (block 314).

Figure 4:
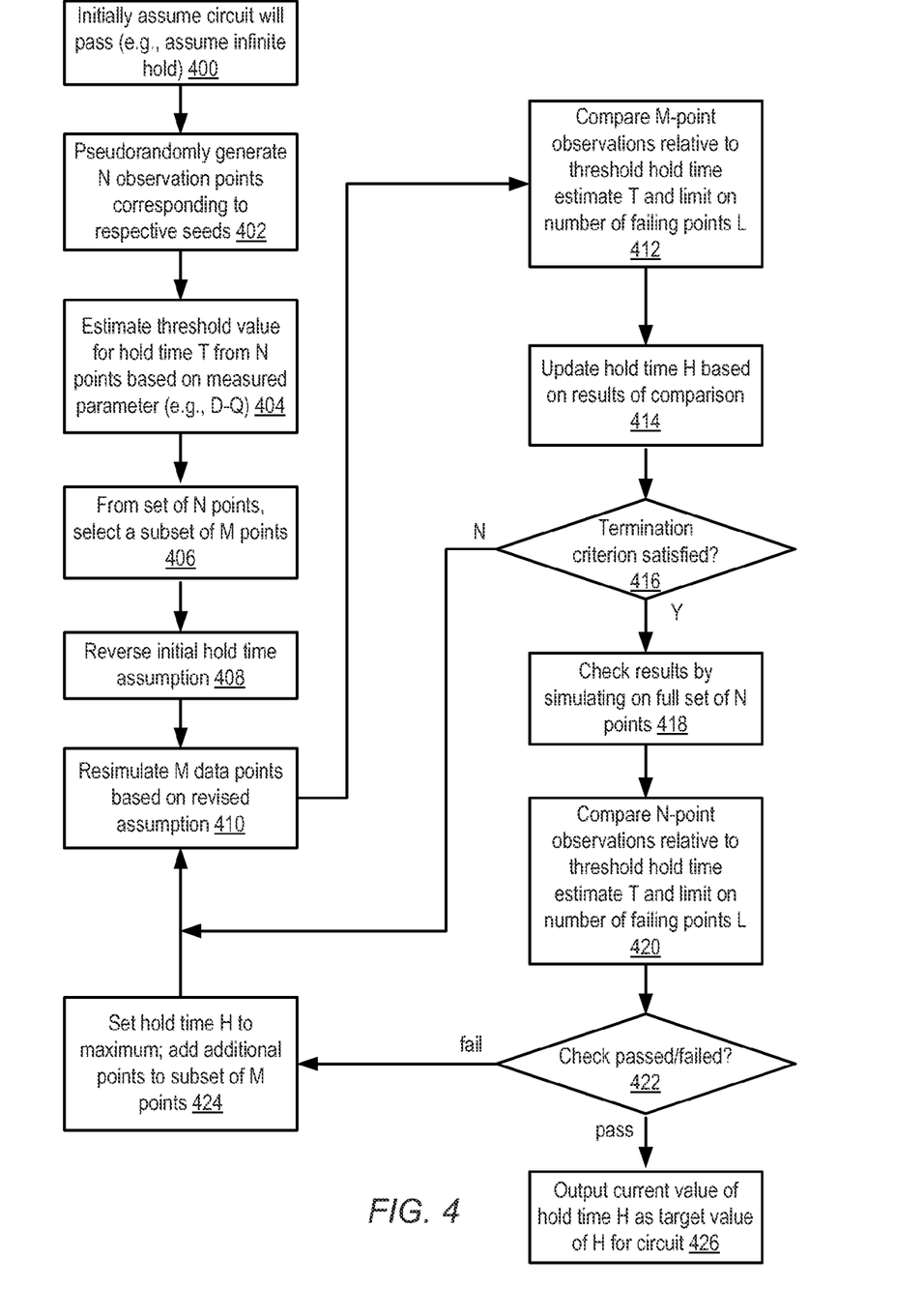
FIG. 4 illustrates an embodiment of a method of hold time analysis in a stochastically-modeled circuit.
Figure 5:
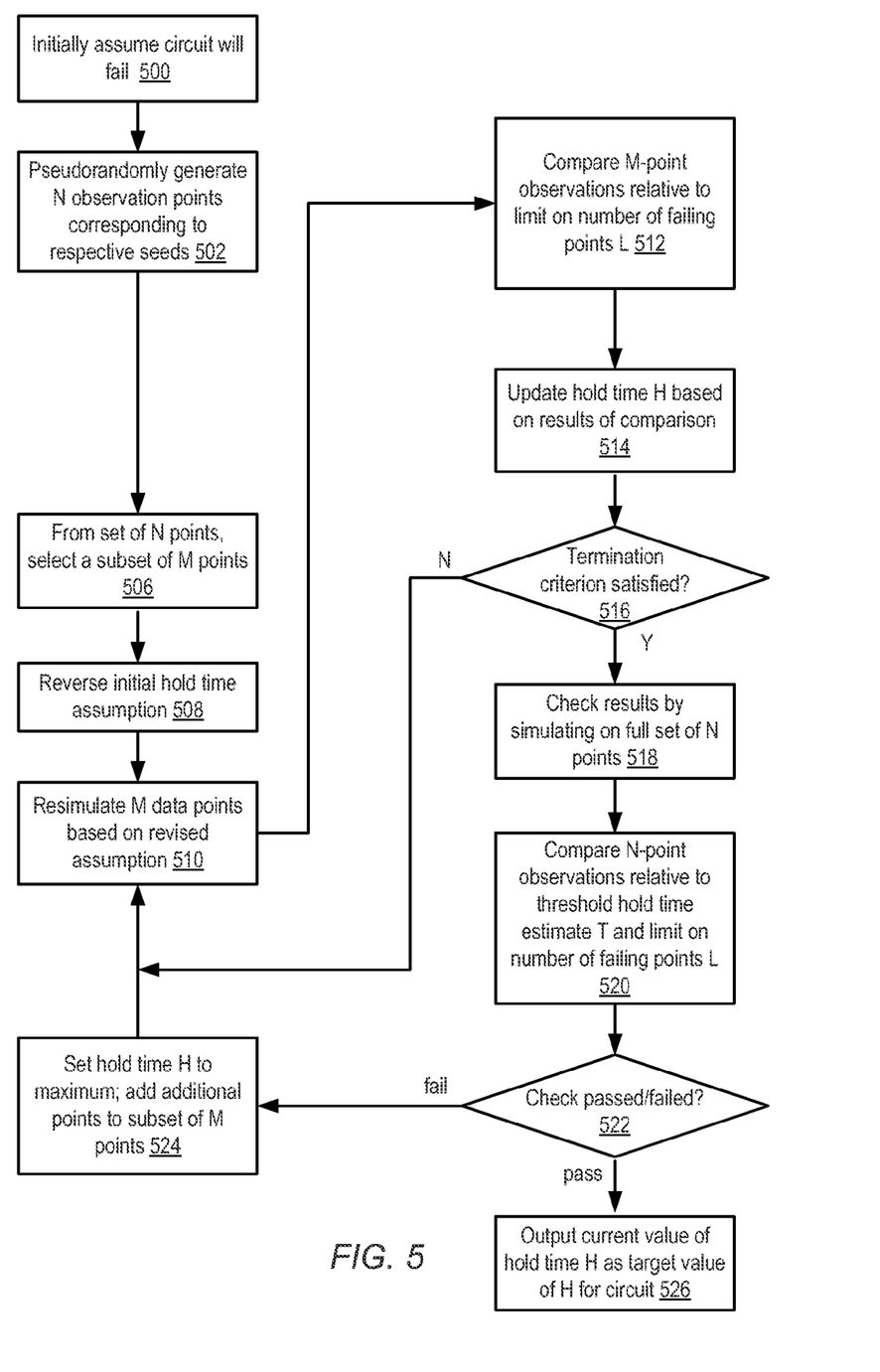
FIG. 5 illustrates another embodiment of a method of hold time analysis in a stochastically-modeled circuit.

FIGS. 4 and 5 illustrate a more specific application of the method of FIG. 3 to the problem of hold time analysis in a stochastically-modeled circuit. In an embodiment, the methods of FIGS. 4 and 5 might be implemented, for example, by instrumenting a netlist or other representation of a circuit to generate certain parameters for various devices according to a pseudorandom number generator. For example, versions of the HSPICE circuit simulation tool include an application programming interface (API) that provides a pseudorandom number generator denoted agauss( ). This function returns a pseudorandom number generated according to a Gaussian distribution and dependent upon a seed value. The HSPICE API also may include support for performing Monte Carlo analysis to generate multiple-point stochastic simulations, which may be used to generate the N-point and M-point simulations discussed above with respect to FIG. 3.

FIGS. 4 and 5 illustrate complementary approaches to the analysis of hold time. The method of FIG. 4 operates from initial conditions that assume the modeled circuit will pass (i.e., that all signals will be held for a sufficient amount of time that no failures will result from hold time violations), whereas the method of FIG. 5 operates from an opposite assumption that the modeled circuit will initially fail (i.e., that at least one signal will transition before it has been captured). Theoretically, both approaches may converge to the same value, although given the stochastic nature of the modeled process and the limited number of points used for modeling, the approaches may produce different values. A designer may then choose to take the average of the results, choose the more (or less) conservative result, and/or consider other sets of initial conditions (e.g., between the two extremes noted above).

The method of FIG. 4 begins by initially assuming that hold time H is infinite (block 400). In various embodiments, this may be performed by assigning an arbitrarily large numerical value to the hold time parameter, or by otherwise configuring the model such that it is certain to operate without exhibiting hold-time-induced failures. Then, an initial set of N pseudorandomly-generated data points based on corresponding seeds may be generated (block 402). For example, an HSPICE representation of the circuit may be simulated using 1,000 different seeds to generate 1,000 different measurements indicative of hold time.

Because the initial assumption was that hold time is infinite, the actual threshold value of hold time that separates the passing and failing regions of the distribution (e.g., as shown in FIG. 2) is uncertain. Moreover, as noted above, in some embodiments, hold time may not be measured directly. Instead, a parameter that is predictive or indicative of hold time, such as D-Q time relative to arrival of a clock signal (e.g., a hold window, which could be determined as D-Q minus the arrival time of a capturing clock signal), may be measured. The threshold value for hold time (denoted T) may be estimated from the initial data set of N points of the measured parameter (block 404).

In some embodiments, an absolute limit L on the total number of failing points out of N total points may be given as a design constraint. For example, at most 10 points out of 1,000 may be allowed to fail. In some such embodiments, the threshold value of hold time may be estimated by sorting the N measured points, selecting the (N−M)th point, and optionally adding some margin to the hold time observed at this point. In the present example, the 1000−10=990th D-Q point may be selected, and a margin of 10% may be added to this value to produce the threshold hold time estimate. However, it is contemplated that other estimation techniques may also be used depending on the nature of the process being modeled.

A subset of M data points may then be selected from the initial set of N data points (block 406). In some embodiments, the number M may be chosen as a multiple of the maximum number of failing points L. For example, if N is 1,000 and L is 10, M might be chosen as 30, 50, or some other number. In some embodiments, the subset of M data points may be selected by selecting the highest M points in the sorted list of N points discussed above.

It is noted that the estimation process and the process for selecting the subset of M points are typically heuristic, in that they may affect the overall rate at which the search process converges, but typically will not affect whether the search process will converge. That is, the precise choice of estimation technique or the number of reduced points generally will not affect the overall correctness of the result that is produced, but it may speed or slow the process of achieving that result.

The initial assumption may then be reversed (block 408). That is, where the initial assumption at block 400 was that hold time was infinite, so as to expect that the circuit would pass, the reversed assumption may be that hold time is some minimum value chosen such that at least some path in the circuit is expected to fail. For example, hold time may be set to negative infinity or a suitably large negative number (it being noted that a zero hold time may not be sufficient to induce hold time failures in some circuits).

The seeds corresponding to the reduced set of M data points may then be resimulated under the revised hold time assumption (block 410). For example, new HSPICE simulations may be performed, although in this instance, only M (e.g., 30, 50, etc.) simulations are needed instead of N (e.g., 1,000).

The observations generated by resimulating the M seeds are then compared relative to the threshold hold time estimate T and the limit on the number of failing points L (block 412). For example, among the M resultant points, the number of D-Q observations that exceed threshold hold time estimate T may be determined. If this number exceeds limit L, the iteration may be deemed to have "failed" for purposes of the search. Otherwise, the iteration may be deemed to have "passed."

Hold time H may then be updated based on the results of the comparison (block 414). For example, assume the interval in which hold time H is expected to fall is defined by A and B, where A is initially set to the assumed minimum value to produce a failure, and B is initially set to the assumed maximum value that produces a pass. (That is, A is assumed to be less than B.) If the comparison for the current iteration failed, then the target hold time may lie in the interval between the current value of H and B. Thus, in some embodiments, the new search interval may be defined as H and B, and the updated value of hold time H to be tested during the next iteration may be generated based on this new interval. For example, the updated value of H may be generated by bisecting the interval, or by calculating the updated value as some fraction of B (e.g., B/2).

Similarly, if the comparison for the current iteration passed, then the target hold time may lie between A and the current value of H. Thus, in some embodiments, the new search interval may be defined as A and H, and the updated value of hold time H to be tested during the next iteration may be generated based on this new interval. For example, the updated value of H may be generated by bisecting the interval, or by calculating the updated value as some fraction of A (e.g., A/2).

A termination criterion for searching the reduced set of M points may then be evaluated (block 416). In some embodiments, the termination criterion may be expressed in terms of whether the current iteration passed and whether the absolute value of the difference between the current and updated values of H is less than a specified amount (e.g., a granularity threshold), although in other embodiments, different criteria may be employed. If the termination criterion is not satisfied (e.g., because the current iteration failed, because the change in H was too large to satisfy the granularity threshold, or both), then operation may continue from block 410 where the subset of M points is again resimulated.

If the termination criterion is satisfied, the results achieved from simulating the subset of M points may be checked with respect to the entire set of N points. Specifically, another N-point pseudorandom simulation (e.g., Monte Carlo simulation) may be performed (block 418). In some embodiments, some or all of the seeds used in this simulation may differ from the seeds used in the initial N-point simulation.

The observations generated by checking the N points simulated in block 418 are then compared relative to the threshold hold time estimate T and the limit on the number of failing points L (blocks 420-422). For example, among the N resultant points, the number of D-Q observations that exceed threshold hold time estimate T may be determined. If this number exceeds limit L, the check may be deemed to have "failed" for purposes of the search. Otherwise, the check may be deemed to have "passed."

If the check fails, hold time H may once again be set to a maximum value (e.g., infinity), and those seeds of the set of N points that exceed threshold time estimate T may be selected as members of a new reduced set of M points (block 424). (It is noted that the number of members of the new reduced set may not be the same as the original reduced set.) Operation may then proceed from block 410.

If the check passes, the current value of hold time H may be output as the target value of H for the stochastically modeled circuit that satisfies the provided constraints (block 426).

The general method of FIG. 5 is similar to that of FIG. 4 in its loop structure, differing primarily in the nature of the assumptions and tests performed. The method of FIG. 5 begins by initially assuming that hold time H is sufficiently negative (e.g., negative infinity) to induce a hold time failure (block 500). In some embodiments, the hold time failure may be defined as storage corruption (e.g., a value stored in a state element does not match the value expected), although other types of failures may be employed. Then, an initial set of N pseudorandomly-generated data points based on corresponding seeds may be generated (block 502). As with FIG. 4, for example, an HSPICE representation of the circuit may be simulated using 1,000 different seeds to generate 1,000 different measurements indicative of hold time.

Use of an objective test for hold time failure, such as storage corruption, may obviate the need to estimate the threshold value for hold time T as was performed in the method of FIG. 4. That is, the hold time failure may be directly observed, rather than inferred.

A subset of M data points may then be selected from the initial set of N data points (block 506). In some embodiments, the number M may be chosen from a sorted list of the N data points as a multiple of the maximum number of failing points L. For example, if N is 1,000 and L is 10, M might be chosen as 30, 50, or some other number. In some embodiments, the subset of M data points may be selected by selecting the highest M points in the sorted list of N points. As noted above, the selection of the subset of M points may be a heuristic process rather than an exact process.

The initial assumption may then be reversed (block 508). That is, where the initial assumption at block 400 was that hold time was minimal, so as to expect that the circuit would exhibit hold time failures, the reversed assumption may be that hold time is some maximal value (e.g., infinity) chosen such that the circuit is expected not to exhibit hold time failures.

The seeds corresponding to the reduced set of M data points may then be resimulated under the revised hold time assumption (block 510). For example, new HSPICE simulations may be performed, although in this instance, only M (e.g., 30, 50, etc.) simulations are needed instead of N (e.g., 1,000).

Hold time failures observed by resimulating the M seeds are then compared relative to the limit on the number of failing points L (block 512). For example, among the M resultant points, the number of instances of storage corruption, or other suitable indications of hold time failure, may be determined. If this number exceeds limit L, the iteration may be deemed to have "failed" for purposes of the search. Otherwise, the iteration may be deemed to have "passed."

Hold time H may then be updated based on the results of the comparison (block 514), and a termination criterion may be evaluated (block 516). In some embodiments, the hold time update and termination criterion may be implemented in a manner similar to that described above with respect to blocks 414 and 416 of FIG. 4. If the termination criterion is not satisfied (e.g., because the current iteration failed, because the change in H was too large to satisfy the granularity threshold, or both), then operation may continue from block 510 where the subset of M points is again resimulated.

If the termination criterion is satisfied, the results achieved from simulating the subset of M points may be checked with respect to the entire set of N points. Specifically, another N-point pseudorandom simulation (e.g., Monte Carlo simulation) may be performed (block 518). In some embodiments, some or all of the seeds used in this simulation may differ from the seeds used in the initial N-point simulation.

The observations generated by checking the N points simulated in block 518 are then compared relative to the limit on the number of failing points L (blocks 520-522). For example, among the N resultant points, the number of instances of storage corruption or other hold time failures may be determined. If this number exceeds limit L, the check may be deemed to have "failed" for purposes of the search. Otherwise, the check may be deemed to have "passed."

If the check fails, hold time H may once again be set to a maximum value (e.g., infinity), and those seeds of the set of N points that yield observed failures may be selected as members of a new reduced set of M points (block 524). (It is noted that the number of members of the new reduced set may not be the same as the original reduced set.) Operation may then proceed from block 510.

If the check passes, the current value of hold time H may be output as the target value of H for the stochastically modeled circuit that satisfies the provided constraints (block 526).

Although the goal-driven search techniques for stochastic processes have been described in the context of hold time analysis of a semiconductor circuit, it is noted that the techniques are not limited to this context. Rather, it is contemplated that these techniques may be applied to goal-driven search of any type of stochastic process.

Processor Overview

Figure 6:
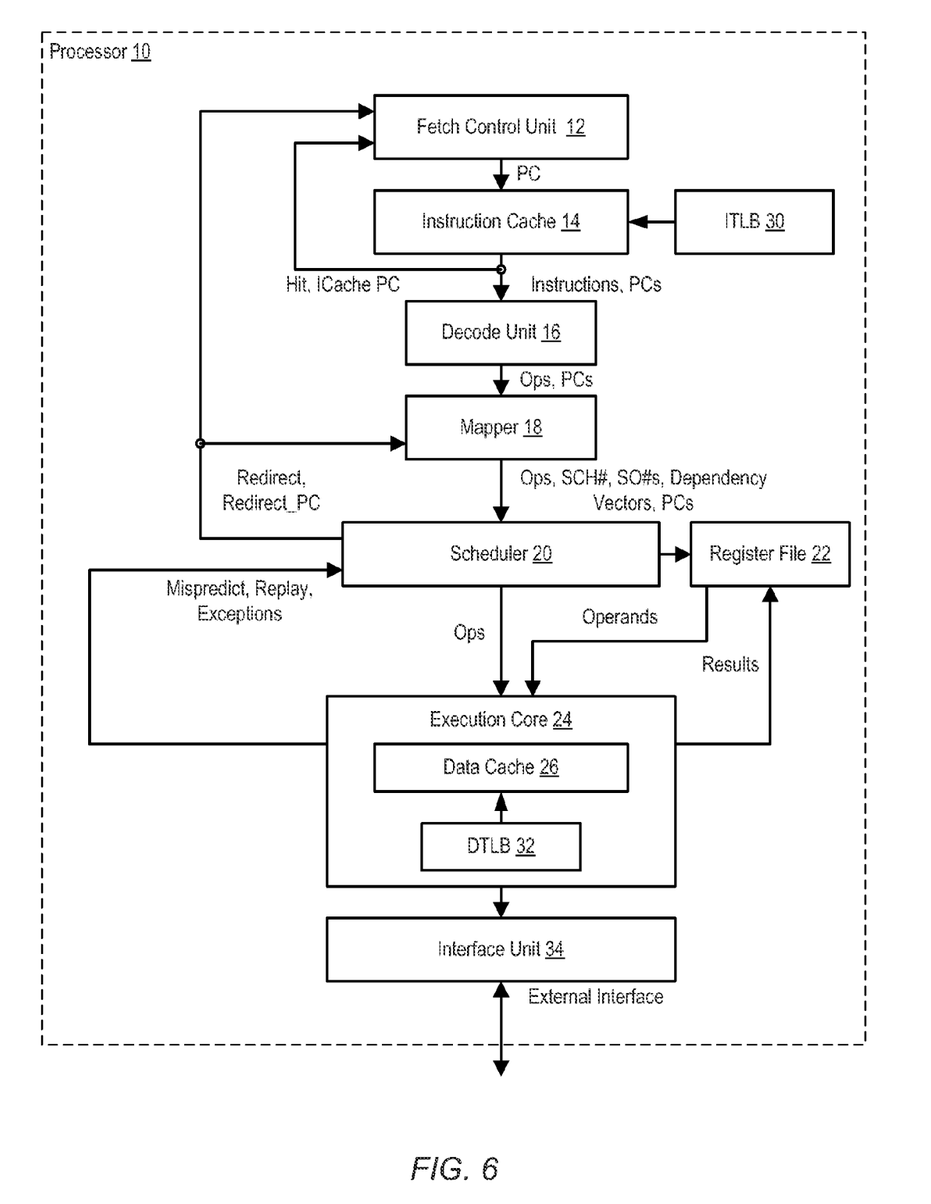
FIG. 6 illustrates an embodiment of a processor that may include circuits that may be stochastically modeled.

Turning now to FIG. 6, a block diagram of an embodiment of a processor 10 is shown. Processor 10 may include one or more circuits that may be stochastically modeled using the goal-driven techniques described above. In the illustrated embodiment, the processor 10 includes a fetch control unit 12, an instruction cache 14, a decode unit 16, a mapper 18, a scheduler 20, a register file 22, an execution core 24, and an interface unit 34. The fetch control unit 12 is coupled to provide a program counter address (PC) for fetching from the instruction cache 14. The instruction cache 14 is coupled to provide instructions (with PCs) to the decode unit 16, which is coupled to provide decoded instruction operations (ops, again with PCs) to the mapper 18. The instruction cache 14 is further configured to provide a hit indication and an ICache PC to the fetch control unit 12. The mapper 18 is coupled to provide ops, a scheduler number (SCH#), source operand numbers (SO#s), one or more dependency vectors, and PCs to the scheduler 20. The scheduler 20 is coupled to receive replay, mispredict, and exception indications from the execution core 24, is coupled to provide a redirect indication and redirect PC to the fetch control unit 12 and the mapper 18, is coupled to the register file 22, and is coupled to provide ops for execution to the execution core 24. The register file is coupled to provide operands to the execution core 24, and is coupled to receive results to be written to the register file 22 from the execution core 24. The execution core 24 is coupled to the interface unit 34, which is further coupled to an external interface of the processor 10.

Fetch control unit 12 may be configured to generate fetch PCs for instruction cache 14. In some embodiments, fetch control unit 12 may include one or more types of branch predictors. For example, fetch control unit 12 may include indirect branch target predictors configured to predict the target address for indirect branch instructions, conditional branch predictors configured to predict the outcome of conditional branches, and/or any other suitable type of branch predictor. During operation, fetch control unit 12 may generate a fetch PC based on the output of a selected branch predictor. If the prediction later turns out to be incorrect, fetch control unit 12 may be redirected to fetch from a different address. When generating a fetch PC, in the absence of a nonsequential branch target (i.e., a branch or other redirection to a nonsequential address, whether speculative or non-speculative), fetch control unit 12 may generate a fetch PC as a sequential function of a current PC value. For example, depending on how many bytes are fetched from instruction cache 14 at a given time, fetch control unit 12 may generate a sequential fetch PC by adding a known offset to a current PC value.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in an embodiment. Other embodiments may use larger or smaller cache line sizes. In response to a given PC from the fetch control unit 12, the instruction cache 14 may output up to a maximum number of instructions. It is contemplated that processor 10 may implement any suitable instruction set architecture (ISA), such as, e.g., the ARM™, PowerPC™, or x86 ISAs, or combinations thereof.

In some embodiments, processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 14 may use virtual address bits for cache indexing and physical address bits for cache tags.

In order to avoid the cost of performing a full memory translation when performing a cache access, processor 10 may store a set of recent and/or frequently-used virtual-to-physical address translations in a translation lookaside buffer (TLB), such as Instruction TLB (ITLB) 30. During operation, ITLB 30 (which may be implemented as a cache, as a content addressable memory (CAM), or using any other suitable circuit structure) may receive virtual address information and determine whether a valid translation is present. If so, ITLB 30 may provide the corresponding physical address bits to instruction cache 14. If not, ITLB 30 may cause the translation to be determined, for example by raising a virtual memory exception.

The decode unit 16 may generally be configured to decode the instructions into instruction operations (ops). Generally, an instruction operation may be an operation that the hardware included in the execution core 24 is capable of executing. Each instruction may translate to one or more instruction operations which, when executed, result in the operation(s) defined for that instruction being performed according to the instruction set architecture implemented by the processor 10. In some embodiments, each instruction may decode into a single instruction operation. The decode unit 16 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 16 and mapper 18 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 16 may be provided to the mapper 18. The mapper 18 may implement register renaming to map source register addresses from the ops to the source operand numbers (SO#s) identifying the renamed source registers. Additionally, the mapper 18 may be configured to assign a scheduler entry to store each op, identified by the SCH#. In an embodiment, the SCH# may also be configured to identify the rename register assigned to the destination of the op. In other embodiments, the mapper 18 may be configured to assign a separate destination register number. Additionally, the mapper 18 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 18 may provide the ops, along with SCH#, SO#s, PCs, and dependency vectors for each op to the scheduler 20. The scheduler 20 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 20 may be configured to schedule the ops for execution in the execution core 24. When an op is scheduled, the scheduler 20 may be configured to read its source operands from the register file 22 and the source operands may be provided to the execution core 24. The execution core 24 may be configured to return the results of ops that update registers to the register file 22. In some cases, the execution core 24 may forward a result that is to be written to the register file 22 in place of the value read from the register file 22 (e.g. in the case of back to back scheduling of dependent ops).

The execution core 24 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 24 may be configured to execute predicted branch ops, and may receive the predicted target address that was originally provided to the fetch control unit 12. The execution core 24 may be configured to calculate the target address from the operands of the branch op, and to compare the calculated target address to the predicted target address to detect correct prediction or misprediction. The execution core 24 may also evaluate any other prediction made with respect to the branch op, such as a prediction of the branch op's direction. If a misprediction is detected, execution core 24 may signal that fetch control unit 12 should be redirected to the correct fetch target. Other units, such as the scheduler 20, the mapper 18, and the decode unit 16 may flush pending ops/instructions from the speculative instruction stream that are subsequent to or dependent upon the mispredicted branch.

The execution core may include a data cache 26, which may be a cache memory for storing data to be processed by the processor 10. Like the instruction cache 14, the data cache 26 may have any suitable capacity, construction, or line size (e.g. direct mapped, set associative, fully associative, etc.). Moreover, the data cache 26 may differ from the instruction cache 14 in any of these details. As with instruction cache 14, in some embodiments, data cache 26 may be partially or entirely addressed using physical address bits. Correspondingly, a data TLB (DTLB) 32 may be provided to cache virtual-to-physical address translations for use in accessing the data cache 26 in a manner similar to that described above with respect to ITLB 30. It is noted that although ITLB 30 and DTLB 32 may perform similar functions, in various embodiments they may be implemented differently. For example, they may store different numbers of translations and/or different translation information.

The register file 22 may generally include any set of registers usable to store operands and results of ops executed in the processor 10. In some embodiments, the register file 22 may include a set of physical registers and the mapper 18 may be configured to map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 22 may include an architected register set containing the committed state of the logical registers and a speculative register set containing speculative register state.

The interface unit 24 may generally include the circuitry for interfacing the processor 10 to other devices on the external interface. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. In various embodiments, the processor 10 may implement any instruction set architecture.

System and Computer Accessible Storage Medium

It is contemplated that in some embodiments, any of the methods, techniques or components described above may be implemented as instructions and data capable of being stored or conveyed via a computer-accessible medium. Such methods or techniques may include, for example and without limitation, methods of implementing a model of a stochastic process (such as a SPICE model of a circuit), methods of evaluating such a model (e.g., through simulation), and/or methods of performing goal-driven search of such a model (e.g., via the techniques illustrated in FIGS. 3-5 and discussed above). It is noted that for any method described above, where no explicit ordering of operations of a method is described or required, the various operations of the method may be performed in any suitable order by instructions that may be executed in any suitable order.

Figure 7:
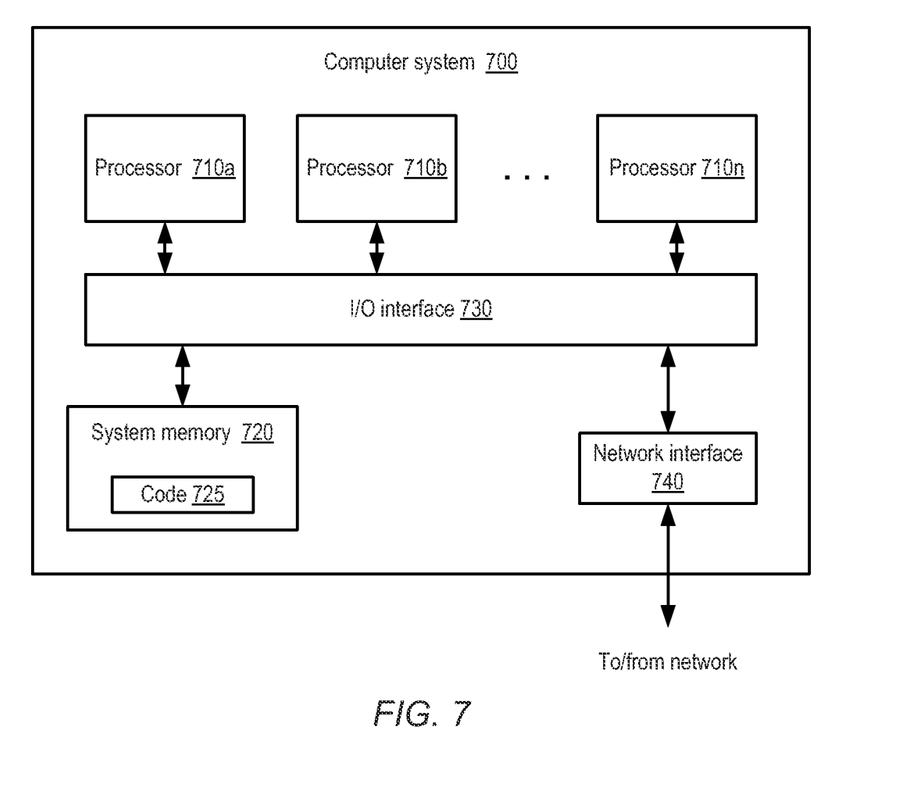
FIG. 7 illustrates an embodiment of a system that may include a computer-accessible storage medium.

An example embodiment of a computer system including tangible, non-transitory, computer-accessible storage media is illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. Computer system 700 may be illustrative of one embodiment of a host system 100 as well as a system hosting a requestor 110, although the specific configuration of computer system 700 may vary for different embodiments of these systems. For example, system 700 may be variously configured as a server system, a desktop or notebook system, an embedded system, a handheld or portable client system, etc. Generally speaking, one or more instances of computer system 700, or a suitable variant thereof, may be configurable to implement any one or more of the methods or techniques described above, according to any suitable functional partitioning.

In various embodiments computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 720 as code 725. It is noted that in some embodiments, code 725 may include instructions and data implementing desired functions that are not directly executable by processor 710 but are represented or encoded in an abstract form that is translatable to instructions that are directly executable by processor 710. For example, code 725 may include instructions specified in an ISA that may be emulated by processor 710, or by other code 725 executable on processor 710. Alternatively, code 725 may include instructions, procedures or statements implemented in an abstract programming language that may be compiled or interpreted in the course of execution. As non-limiting examples, code 725 may include code specified in a procedural or object-oriented programming language such as C or C++, a scripting language such as perl, a markup language such as HTML or XML, a language that is specific to a particular design tool or environment (e.g., HSPICE), or any other suitable language.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to network 120, such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 720 may be one embodiment of a computer-accessible storage medium configured to store instructions and data as described above. However, in other embodiments, other types of computer-accessible storage media may be employed. Generally speaking, a computer-accessible storage medium may include mass storage media such as magnetic or optical media, e.g., disk or CD/DVD-ROM coupled to computer system 700 via I/O interface 730. A computer-accessible medium may also include any volatile or non-volatile memory media such as RAM (e.g. SDRAM, DDR SDRAM, RDRAM, SRAM, etc.), ROM, etc, that may be included in some embodiments of computer system 700 as system memory 720 or another type of memory (e.g., cache). A computer-accessible storage medium may generally be accessible (e.g., for reading and/or writing via a storage interface) via transmission media or signals such as electrical, electromagnetic, or digital signals, conveyed via a communication medium such as a network and/or a wireless link, such as may be implemented via network interface 740.

Numerous variations and modifications will become apparent to those skilled in the art once the above disclosure is fully appreciated. It is intended that the following claims be interpreted to embrace all such variations and modifications.

What is claimed is:

1. A method, comprising: one or more computers performing:

pseudorandomly generating an initial set of N observation points of a stochastic model of a digital electronic circuit dependent upon a probability distribution function, wherein pseudorandomly generating the initial set of N observation points comprises simulating the digital electronic circuit, wherein each of the initial set of N observation points is generated independently of any other point within the initial set of N observation points, wherein each of the initial set of N observation points is generated based on a respective seed, wherein each seed is formatted as a parameter of a callable pseudorandom number generator function, and wherein a sequence of pseudorandom numbers used to generate a given one of the initial set of N observation points is reproducible from the respective seed corresponding to the given one of the initial set of an observation point, wherein N is an integer;

selecting a subset of M points from the initial set of N observation points according to a selection function, wherein M is an integer less than N;

searching the subset of M points to identify a target value of an electrical parameter of the digital electronic circuit;

pseudorandomly generating a new set of observation points dependent upon the probability distribution function, wherein pseudorandomly generating the new set of observation points comprises resimulating the digital electronic circuit, wherein pseudorandomly generating the new set of observation points further comprises reproducing one or more observation points from the initial set of N observation points using the one or more respective seeds corresponding to the one or more observation points and generating one or more new observation points, wherein each of the new set of observation points is generated independently of any other point within the new set of observation points, wherein each of the new set of observation points is generated based on a respective new seed, and wherein each new seed is formatted as a parameter of the callable pseudorandom number generator function;

determining whether the new set of observation points includes, according to the selection function, one or more additional points not present in the subset of M points;

in response to determining that the new set of observation points includes one or more additional points not present in the subset of M points, adding the one or more additional points to the subset of M points to generate a revised subset, and searching the revised subset to identify the target value; and in response to determining that the new set of observation points does not include one or more additional points, outputting the target value determined from the subset of M points as the target value of the stochastic model and verifying that the target value satisfies a design criterion of the digital electronic circuit.

2. The method of claim 1, wherein at least some seeds used to generate the new set of observation points correspond to seeds used to generate the initial set of N observation points.

3. The method of claim 1, wherein N is at least ten times M.

4. A system, comprising:
a memory configured to store instructions;
and a processor configured to execute the instructions, wherein the instructions are executable to implement:
generating an N-point Monte Carlo simulation of a stochastic model of a digital electronic circuit, wherein each point of the N-point Monte Carlo simulation is generated independently of any other point within the N-point Monte Carlo simulation, and wherein each point of the N-point Monte Carlo simulation is generated based on a respective seed;
selecting a subset of M points from the N-point Monte Carlo simulation, wherein M is less than N;

searching the subset of M points to identify a target value, wherein said searching comprises generating one or more M-point Monte Carlo simulations of the stochastic model;

checking the target value, wherein said checking comprises generating an additional N-point Monte Carlo simulation of the stochastic model of the digital electronic circuit dependent on results of searching the subset of M points; and verifying that the target value satisfies a design criterion of the digital electronic circuit;

wherein generating an additional N-point Monte Carlo simulation comprises reproducing one or more observation points from the N-point Monte Carlo simulation using one or more of the respective seeds corresponding to the one or more observation points and generating one or more new observation points, wherein each point of the additional N-point Monte Carlo simulation is generated independently of any other point within the additional N-point Monte Carlo simulation, wherein each new observation point of the one or more new observation points is generated based on a respective new seed, and wherein each new seed is formatted as a parameter of a callable pseudorandom number generator function.

5. The system of claim 4, wherein searching the subset of M points comprises iterating over the subset of M points until a termination criterion is satisfied.

6. The system of claim 4, wherein searching the subset of M points comprises performing a bisectional search of the subset of M points for the target value.

7. The system of claim 4, wherein selecting the subset of M points from the initial set of N observation points according to the selection function comprises:
ordering the initial set of N observation points according to a characteristic of the initial set of N observation points to generate an ordered set; and
selecting, as the subset of M points, one or more points from the ordered set dependent upon the characteristic.

8. The system of claim 4, wherein selecting the subset of M points from the initial set of N observation points according to the selection function comprises selecting one or more points from the initial set of N observation points for which a corresponding simulation run fails to satisfy a threshold criterion.

9. The system of claim 4, wherein generating the N-point Monte Carlo simulation is performed dependent upon an initial set of pseudorandom seeds, and wherein generating the additional N-point Monte Carlo simulation is performed dependent upon at least some pseudorandom seeds not included in the initial set.

10. A non-transitory computer-accessible storage medium that stores instructions, wherein the instructions are configured to be executed by a processor to:
generate an initial N-point pseudorandom simulation of a digital electronic circuit using one or more parameters indicative of an initial assumption that the digital electronic circuit will satisfy a hold time requirement, wherein each point of the N-point pseudorandom simulation is generated dependent upon a probability distribution function, wherein each point of the N-point pseudorandom simulation is generated independently of any other point within the N-point pseudorandom simulation, and wherein each point of the N-point pseudorandom simulation is generated based on a respective seed, wherein each seed is formatted as a parameter of a callable pseudorandom number generator function;

generate, from resultant data points of the initial N-point pseudorandom simulation, an estimated threshold value of a hold time of the digital electronic circuit;

select a subset of M points from the initial N-point pseudorandom simulation, wherein M is less than N;

for the seeds corresponding to the subset of M points, resimulate the digital electronic circuit and update the estimated threshold value of the hold time, wherein resimulation uses one or more parameters indicative of an initial assumption that the digital electronic circuit will fail to satisfy the hold time requirement, and wherein the instructions are configured to iteratively resimulate and update the estimated threshold value until a termination criterion is satisfied;

check the estimated threshold value by performing another N-point pseudorandom simulation of the digital electronic circuit responsive to the termination criterion being satisfied;

generate an additional pseudorandom simulation of the digital electronic circuit dependent upon the probability distribution function, wherein the additional pseudorandom simulation includes P points, wherein P is greater than M and less than N, and wherein the P points includes one or more points from the initial N-point pseudorandom simulation reproduced using the one or more respective seeds corresponding to the one or more points from the initial N-point simulation, and one or more new points, wherein each point of the additional pseudorandom simulation is generated independently of any other point within the additional pseudorandom simulation, wherein each new point of the one or more new points is generated based on a respective new seed, and wherein each new seed is formatted as a parameter of the callable pseudorandom number generator function.

11. The non-transitory computer-accessible storage medium of claim 10, wherein the instructions are further configured to be executed by the processor to:

determine, based on the additional pseudorandom simulation, a number of points that fail the hold time requirement using the estimated threshold value of the hold time that satisfies the termination criterion;

in response to determining that the number of points that fail the hold time requirement satisfies a limit, output the estimated threshold value of the hold time as a target hold time for the digital electronic circuit.

12. The non-transitory computer-accessible storage medium of claim 11, wherein the instructions are further configured to be executed by the processor to:

in response to determining that the number of points that fail the hold time requirement does not satisfy the limit, select a new subset of M points from the additional pseudorandom simulation, wherein members of the new subset of M points include points having seeds corresponding to points of the additional pseudorandom simulation that fail the hold time requirement;

for the seeds corresponding to the new subset of M points, resimulate the digital electronic circuit and update the estimated threshold value of the hold time, wherein resimulation uses one or more parameters indicative of an initial assumption that the digital electronic circuit will satisfy the hold time requirement, and wherein the instructions are configured to iteratively resimulate and update the estimated threshold value until the termination criterion is satisfied.

13. The non-transitory computer-accessible storage medium of claim 11, wherein the additional pseudorandom simulation is an additional N-point pseudorandom simulation.

14. The non-transitory computer-accessible storage medium of claim 11, wherein to generate the estimated threshold value of the hold time of the digital electronic circuit, the instructions are further executable to measure one or more parameters of the digital electronic circuit that are indicative of hold time.

15. The non-transitory computer-accessible storage medium of claim 14, wherein the one or more parameters of the digital electronic circuit that are indicative of hold time include one or more data to output delay times, adjusted for arrival time of a clock signal, that correspond to one or more timing paths through the digital electronic circuit.

16. A non-transitory computer-accessible storage medium that stores instructions, wherein the instructions are configured to be executed by a processor to:

generate an initial N-point pseudorandom simulation of a digital electronic circuit using one or more parameters indicative of an initial assumption that the digital electronic circuit will fail to satisfy a hold time requirement, wherein each point of the N-point pseudorandom simulation is generated dependent upon a probability distribution function, wherein each point of the N-point pseudorandom simulation is generated independently of any other point within the N-point pseudorandom simulation, and wherein each point of the N-point pseudorandom simulation is generated based on a respective seed, wherein each seed is formatted as a parameter of a callable pseudorandom number generator function;

select a subset of M points from the initial N-point pseudorandom simulation;

for the seeds corresponding to the subset of M points, resimulate the digital electronic circuit and update an estimated threshold value of a hold time of the digital electronic circuit, wherein resimulation uses one or more parameters indicative of an initial assumption that the digital electronic circuit will satisfy the hold time requirement, and wherein the instructions are configured to iteratively resimulate and update the estimated threshold value until a termination criterion is satisfied;

check the estimated threshold value by performing another N-point pseudorandom simulation of the digital electronic circuit responsive to the termination criterion being satisfied;

generate an additional pseudorandom simulation of the digital electronic circuit dependent upon the probability distribution function, wherein the additional pseudorandom simulation includes P points, wherein P is greater than M and less than N, and wherein the P points includes one or more points from the initial N-point pseudorandom simulation reproduced using the one or more respective seeds corresponding to the one or more points from the initial N-point simulation, and one or more new points, wherein each point of the additional pseudorandom simulation is generated independently of any other point within the additional pseudorandom simulation, wherein each new point of the one or more new points is generated based on a respective new seed, and wherein each new seed is formatted as a parameter of the callable pseudorandom number generator function.

17. The non-transitory computer-accessible storage medium of claim 16, wherein the instructions are further configured to be executed by the processor to:

determine, based on the additional pseudorandom simulation, a number of points that fail the hold time requirement using the estimated threshold value of the hold time that satisfies the termination criterion;

in response to determining that the number of points that fail the hold time requirement satisfies a limit, output the estimated threshold value of the hold time as a target hold time for the digital electronic circuit.

18. The non-transitory computer-accessible storage medium of claim 17, wherein the instructions are further configured to be executed by the processor to:

in response to determining that the number of points that fail the hold time requirement does not satisfy the limit, select a new subset of M points from the additional pseudorandom simulation, wherein members of the new subset of M points include points having seeds corresponding to points of the additional pseudorandom simulation that fail the hold time requirement;

for the seeds corresponding to the new subset of M points, resimulate the digital electronic circuit and update the estimated threshold value of the hold time, wherein resimulation uses one or more parameters indicative of an initial assumption that the digital electronic circuit will satisfy the hold time requirement, and wherein the instructions are configured to iteratively resimulate and update the estimated threshold value until the termination criterion is satisfied.

19. The non-transitory computer-accessible storage medium of claim 17, wherein the additional pseudorandom simulation is an additional N-point pseudorandom simulation.

20. The non-transitory computer-accessible storage medium of claim 16, wherein to determine that the digital electronic circuit fails to satisfy the hold time requirement, the instructions are further execute to detect a simulated occurrence of one or more instances of storage corruption.

* * * * *